Jan. 14, 1964 G. H. SAMPSON 3,117,757

EASEL-TYPE MOUNT

Filed Dec. 12, 1960

INVENTOR.
George H. Sampson
BY
Roberts, Cushman & Grover
ATTORNEYS

3,117,757
EASEL-TYPE MOUNT
George H. Sampson, Middleboro, Mass., assignor to Winthrop-Atkins Co., Inc., Middleboro, Mass., a corporation of Massachusetts
Filed Dec. 12, 1960, Ser. No. 75,233
1 Claim. (Cl. 248—35)

This invention relates to easel-type supports for displaying a calendar pad or the like, and has for its principal objects to provide a novel type mount which may be set up without having to fold or otherwise manipulate or dispose a brace or the like between the supported panel and the legs; to provide a mount which has no projecting tongues, flanges, braces or the like to become broken, torn or to interfere with disposition in a perfectly flat configuration; to provide a mount which may be set up merely by bending the supporting panel and the leg to the desired angle thereby to provide for an infinite number of positions and to afford maximum simplicity; and to provide a method of making the mount which will not interfere with printing, decorating and/or embossing the display surfaces thereof.

In accordance with this invention, the calendar mount comprises a pair of rigid panels hingedly joined with an edge of one spaced from an edge of the other, each of the panels including two panel elements defining a pocket, the pockets being open at the hinged edges of the panel elements and one panel element of one of the pairs containing an opening through it in communication with the end of the pocket therein remote from the hinged edges, and a flat deformable element extending from one pocket to the other across the space between the hinged edges with its ends frictionally engaged between the walls of the pockets, the deformable element being operative to hold the panels at a predetermined position relative to each other and the opening in the one panel element being in the form of a narrow slot through which the deformable element may be thrust into the pocket.

The invention will now be described in greater detail with reference to the accompanying drawings wherein.

Figure 1:
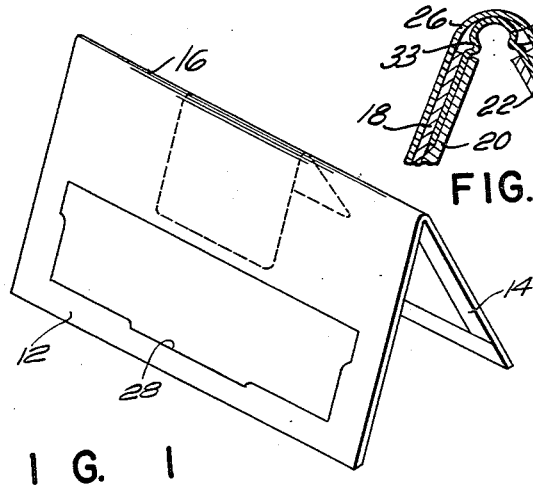
FIG. 1 is a perspective of an easel-type mount such as is commonly used for supporting a calendar pad.
Figures 2, 7:
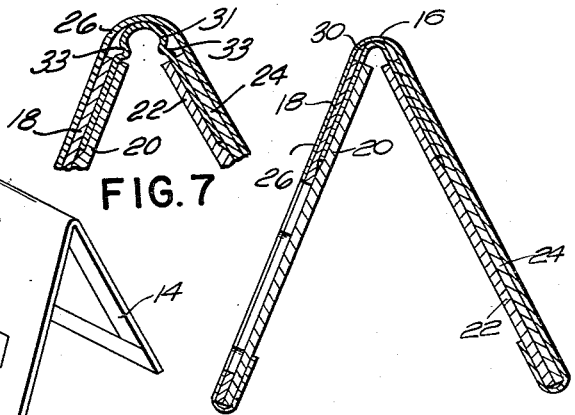
FIG. 2 is a vertical section of FIG. 1, taken from front to back.
FIG. 7 is a fragmentary vertical section showing the configuration of the deformable member after the initial bending.

As shown in FIGS. 1 and 2, the mount is comprised of a supporting panel 12 and a leg panel 14, which are joined at their adjacent edges by a hinge 16 so that they may be disposed at an angle relative to each other, such as shown in FIG. 2. While the leg panel 14, as herein shown, extends the full width of the supporting panel, it is to be understood, of course, that it may be of narrower construction. In FIGS. 1 and 2, the supporting panel is made up of front and rear panel elements 18 and 20 and correspondingly the leg panel is made up of front and rear panel elements 22 and 24. A covering material of decorative character 26 is applied to the outer faces of the panel elements 18 and 24, extends across the adjacent edges of the panels thereby forming the hinge 16, and is folded over the lateral and bottom edges of the panel elements. There is an opening 28 in the front panel element of the supporting panel in which a calendar pad, or the like, may be disposed.

In accordance with this invention the supporting panel 12 and the leg panel 14 are held in angular relation to each other by a deformable member 30 which is disposed with its ends between the front and rear panel elements of the supporting panel and the leg panel, and with an intermediate portion substantially coinciding with the hinge, the panel elements being unjoined at their the hinge. The deformable interfaces, or at least adjacent the hinge. The deformable member 30 conveniently may be in the form of a strip of sheet metal which is relatively soft but stiff enough to retain a given position when bent to that position by force applied to the supporting panel and leg panel, and of a character that will endure repeated folding and bending without failure. The deformable member is preferably made of a material which, when first bent, work-hardens, thus providing a substantially permanent knee 31 (FIG. 7) at the hinge which is stiffer than the legs adjacent the hinge, so that subsequent bending for adjusting the supporting panel and leg panel take place along lines 33—33 coinciding substantially with the edges of the supporting panel and leg panel rather than in the knee itself.

Figure 3:
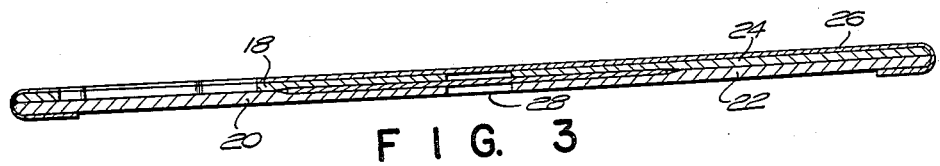
FIG. 3 is a longitudinal section of the mount prior to folding.
Figure 4:
FIG. 4 is a longitudinal section of a modification of the mount shown in FIG. 3, wherein a slot or cut is provided to permit entrance between the interfaces of the plies in lieu of a window opening.
Figure 5:
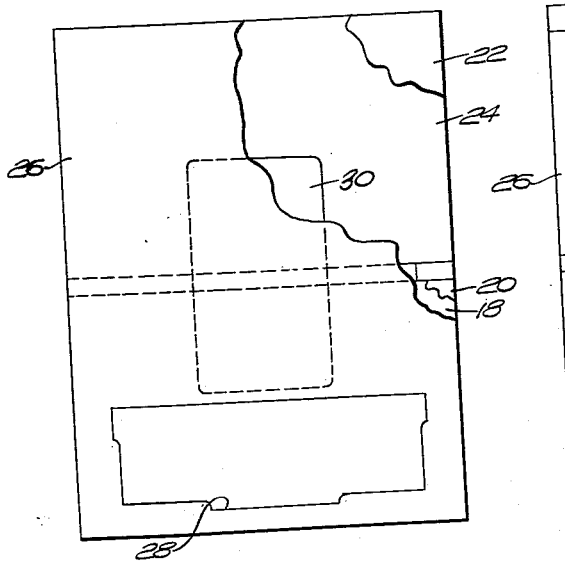
FIG. 5 is a plan view from the front side of the mount shown in FIG. 1, prior to folding.
Figure 6:
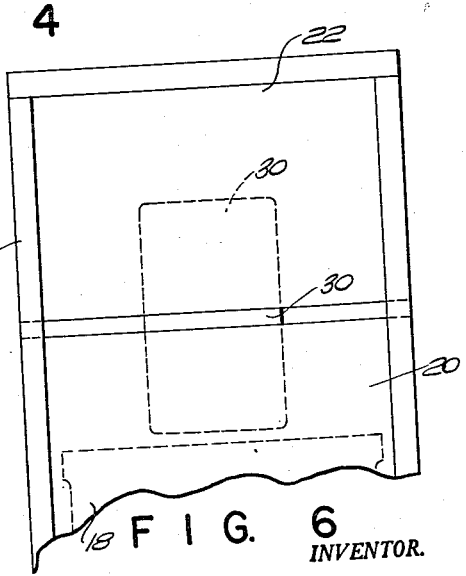
FIG. 6 is a plan view from the rear side of the mount shown in FIG. 1, prior to folding.

The mount shown, as in FIGS. 1 and 2, is made as illustrated in FIGS. 3, 5 and 6 by joining the adjacent edges of the two pairs of panel elements 18 and 20 and 22 and 24 with the covering material 26 by applying it to the outer faces of the panel elements 18 and 24 and folding it over the lateral and end edges (FIG. 6), into engagement with the inner sides of the panel elements 20 and 22. By joining the panel elements with the covering material in this fashion the interfaces between the panel elements are left unjoined. The unjoined portions of the panel elements provide pockets at opposite sides of the hinge. In the preferred form (FIG. 4) a slit 32 is formed through one of the panel elements adjacent the inner end of the pocket. The outer panel elements are now printed and/or embossed to provide suitable decoration and advertising media, whereupon the deformable member 30 is inserted through the slit 32 and pushed between the panel elements across the hinge into the space between the panel elements of the leg panel to a position such that one end of the deformable member lies between the panel elements of the supporting panel, the other end between the panel elements of the leg panel, and an intermediate portion coincides with the hinge. The pocketed ends of the deformable element are frictionally retained between the panel elements. All that is required to set the mount up is to bend the supporting panel and the leg panel relative to each other to the desired angle.

In the form illustrated in FIG. 4, the calendar pad is attached to the supporting panel by adhesive, staples or the like and a covering ply 34 may be applied to the inner faces of the inner panel elements so that it covers the hinge opening and the slit 32, of course, will be formed through this covering.

When a window opening 28 is cut through the covering 26 and panel element 18 of the supporting panel 12, the slit 32 may be omitted and the deformable element thrust through the window between the panel elements to take up a position such as described heretofore.

In each instance the indicia and/or decorative material are applied prior to inserting the deformable member.

The first time the deformable member is bent, a substantially permanent set or knee is imparted thereto which tends to retain its shape so that subsequent bending takes place along lines parallel to the knee as shown in FIG. 7. This initial set acts as a retainer which holds the deformable member in place so that it does not slip either way relative to the hinge and hence so that no anchoring means is required for holding the ends in place. The knee, however, can be bent flat by pressing it firmly against a rigid surface to flatten the mount when desired.

The principal advantages of a mount of this kind are that the supporting panel and leg may be disposed at an infinite number of angles relative to each other without restriction; that there are no braces or the like which must be folded, manipulated or otherwise latched with other parts or become broken or unreliable in use; which provides a mount which may be manufactured and shipped perfectly flat so that it takes up a minimum space; and which provides a method of incorporating a deformable hinge without interfering with the embossing and/or printing of the display surfaces such as would take place with a hinge structure that had to be incorporated prior to printing and/or embossing.

It should be understood that the present disclosure is for the purpose of illustration only and that this invention includes all modifications and equivalents which fall within the scope of the appended claim.

I claim:

A calendar mount assembly comprising the combination of a pair of rigid panels hingedly joined with an edge of one spaced from an edge of the other, each of said panels including two panel elements defining a pocket, said pockets being open at the hinged edges of the panel elements, and one panel element of one of the pairs containing an opening through it in communication with the end of the pocket therein remote from the hinged edges, and a flat deformable element extending from one pocket to the other across the space between the hinged edges with its ends frictionally engaged between the walls of the pockets, said deformable element being operative to hold the panels at a predetermined position relative to each other, the opening in the one ponent element being in the form of a narrow slot through which the deformable member may be thrust into the pockets.

References Cited in the file of this patent
UNITED STATES PATENTS

| | | |
|---|---|---|
| 1,950,223 | Budd | Mar. 6, 1934 |
| 2,553,174 | Cross | May 15, 1951 |
| 2,601,029 | King | June 17, 1952 |
| 2,825,516 | Cross | Mar. 4, 1958 |
| 2,916,236 | Cross | Dec. 8, 1959 |
| 3,002,720 | Cross | Oct. 3, 1961 |